(12) United States Patent
Kim et al.

(10) Patent No.: US 10,784,015 B2
(45) Date of Patent: Sep. 22, 2020

(54) BUS BAR WITH NOVEL STRUCTURE

(71) Applicant: LG CHEM, LTD., Seoul (KR)

(72) Inventors: Kyoung Ho Kim, Daejeon (KR); Chae Ho Chung, Daejeon (KR); Ye Hoon Im, Daejeon (KR); Won Chan Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1015 days.

(21) Appl. No.: 14/360,869

(22) PCT Filed: Jan. 23, 2013

(86) PCT No.: PCT/KR2013/000518
§ 371 (c)(1),
(2) Date: May 27, 2014

(87) PCT Pub. No.: WO2013/118985
PCT Pub. Date: Aug. 15, 2013

(65) Prior Publication Data
US 2014/0370339 A1    Dec. 18, 2014

(30) Foreign Application Priority Data

Feb. 6, 2012 (KR) .................. 10-2012-0012024

(51) Int. Cl.
*H01B 5/02* (2006.01)
*H01M 2/20* (2006.01)
(Continued)

(52) U.S. Cl.
CPC ........... *H01B 5/02* (2013.01); *F28D 15/0233* (2013.01); *F28D 15/04* (2013.01); *H01M 2/20* (2013.01);
(Continued)

(58) Field of Classification Search
CPC ................................. H01M 10/5079
See application file for complete search history.

(56) References Cited

U.S. PATENT DOCUMENTS

| 3,728,585 A | 4/1973 | Olashaw |
| 5,068,491 A * | 11/1991 | Ogata ................ H02G 5/10 |
| | | 174/129 B |

(Continued)

FOREIGN PATENT DOCUMENTS

| JP | 2001143769 A | 5/2001 |
| JP | 2006210245 A | 8/2006 |

(Continued)

*Primary Examiner* — Barbara L Gilliam
*Assistant Examiner* — Nathanael T Zemui
(74) *Attorney, Agent, or Firm* — Dentons US LLP

(57) ABSTRACT

Disclosed herein is a bus bar connected or fastened to a terminal part of a battery pack and fixedly mounted to a battery pack case, the bus bar including a power input part located at one end of the bus bar such that the power input part is connected or fastened to an output terminal part of the battery pack, a power output part located at the other end of the bus bar such that the power output part is connected or fastened to an input terminal part of the battery pack, a plate-shaped main body connected between the power input part and the power output part, the plate-shaped main body including a vapor chamber, and a fastening part formed at the power input part to fix the bus bar to the battery pack case.

15 Claims, 5 Drawing Sheets

(51) Int. Cl.

| | | |
|---|---|---|
| *F28D 15/04* | (2006.01) | |
| *F28D 15/02* | (2006.01) | |
| *H01M 10/6552* | (2014.01) | |
| *H01M 10/6569* | (2014.01) | |
| *H01M 10/625* | (2014.01) | |
| *H01M 10/613* | (2014.01) | |
| *H01M 10/6553* | (2014.01) | |
| *H01M 10/6567* | (2014.01) | |

(52) U.S. Cl.
CPC ......... *H01M 2/206* (2013.01); *H01M 10/613* (2015.04); *H01M 10/625* (2015.04); *H01M 10/6552* (2015.04); *H01M 10/6553* (2015.04); *H01M 10/6567* (2015.04); *H01M 10/6569* (2015.04); *H01M 2220/20* (2013.01)

(56) References Cited

U.S. PATENT DOCUMENTS

| | | |
|---|---|---|
| 5,173,572 A | 12/1992 | Martin |
| 6,010,800 A | 1/2000 | Stadnick et al. |
| 7,786,384 B2 | 8/2010 | Diaz |
| 2002/0136944 A1* | 9/2002 | Nemoto .............. H01M 10/613 429/120 |
| 2010/0025105 A1* | 2/2010 | Hirschfeld ............. H02B 1/565 174/72 B |
| 2010/0216009 A1 | 8/2010 | Kim |
| 2010/0302733 A1 | 12/2010 | Woody et al. |
| 2011/0020686 A1* | 1/2011 | Yamamoto .............. H01M 2/20 429/120 |
| 2011/0189522 A1* | 8/2011 | Kim ...................... H01M 10/60 429/120 |
| 2012/0156537 A1* | 6/2012 | Meintschel ......... B60L 11/1874 429/99 |

FOREIGN PATENT DOCUMENTS

| | | | |
|---|---|---|---|
| JP | 2009-245730 A | | 10/2009 |
| JP | 2011-029103 A | | 2/2011 |
| JP | 2011-0029103 A | | 2/2011 |
| JP | 2011029103 A | * | 2/2011 |
| KR | 10-0887759 B1 | | 3/2009 |
| WO | 2007/046587 A1 | | 4/2007 |
| WO | 2007046587 A1 | | 4/2007 |
| WO | 2009-064060 A1 | | 5/2009 |

* cited by examiner

【FIG. 1】
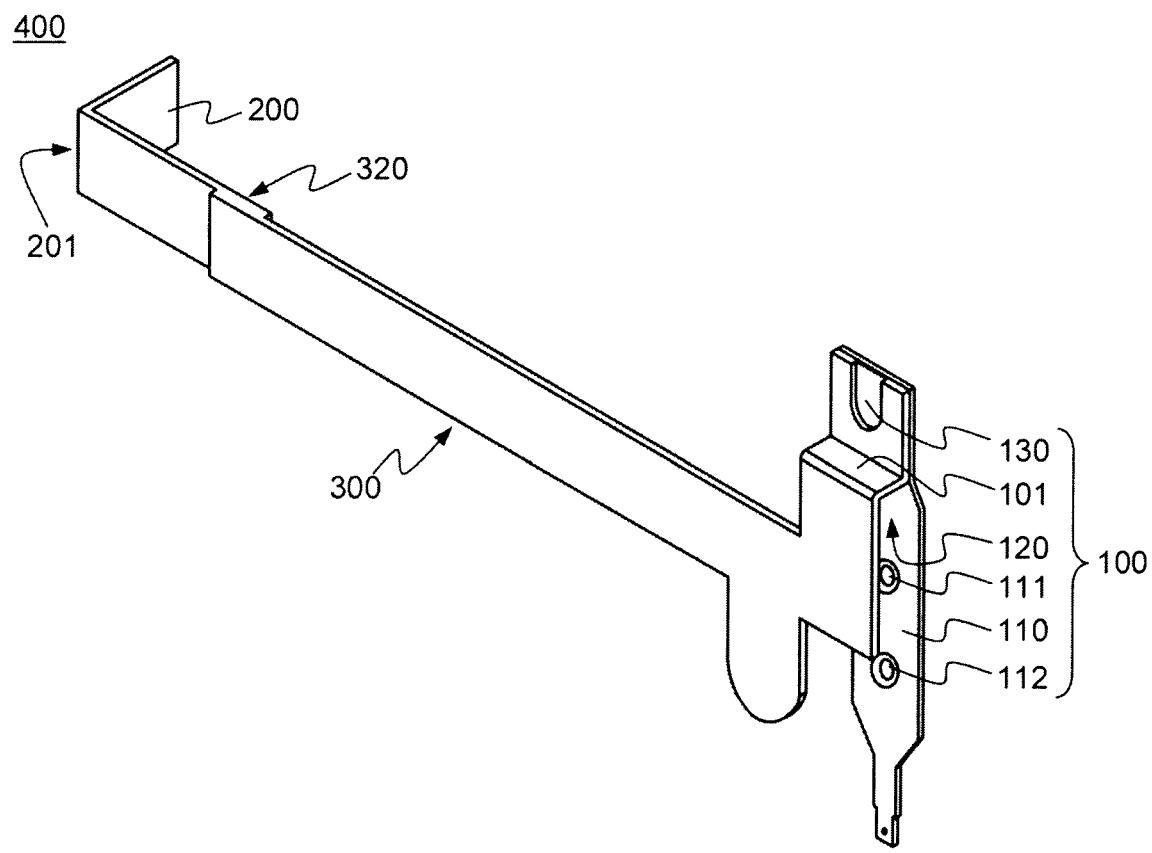

[FIG. 2]
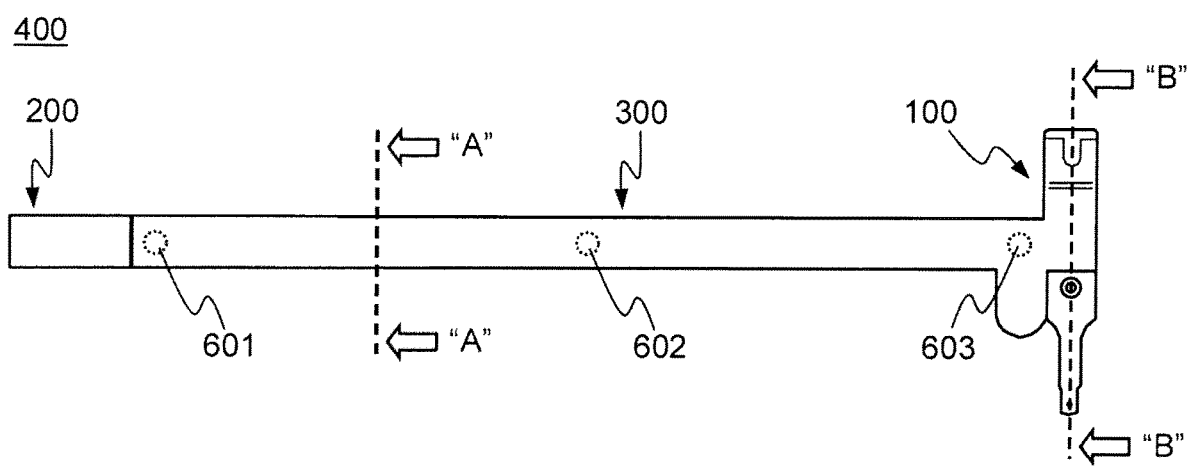

[FIG. 3]
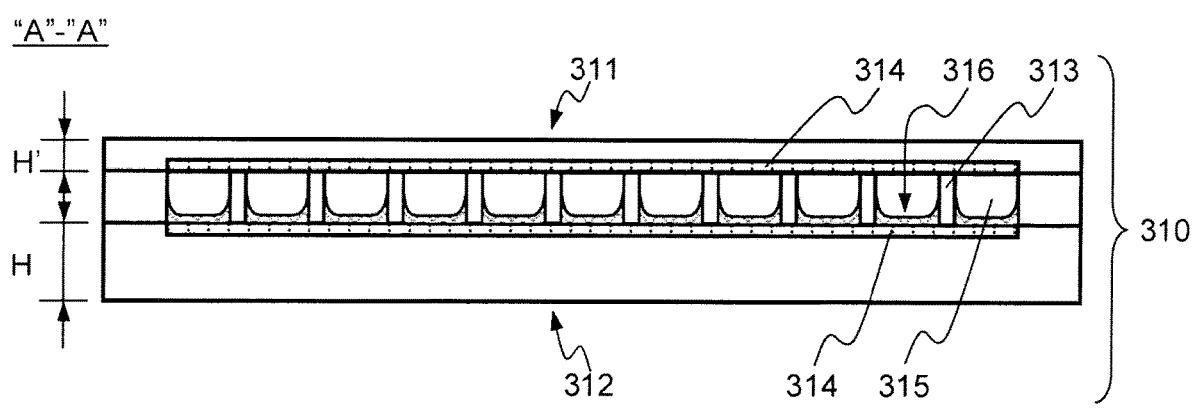

[FIG. 4]
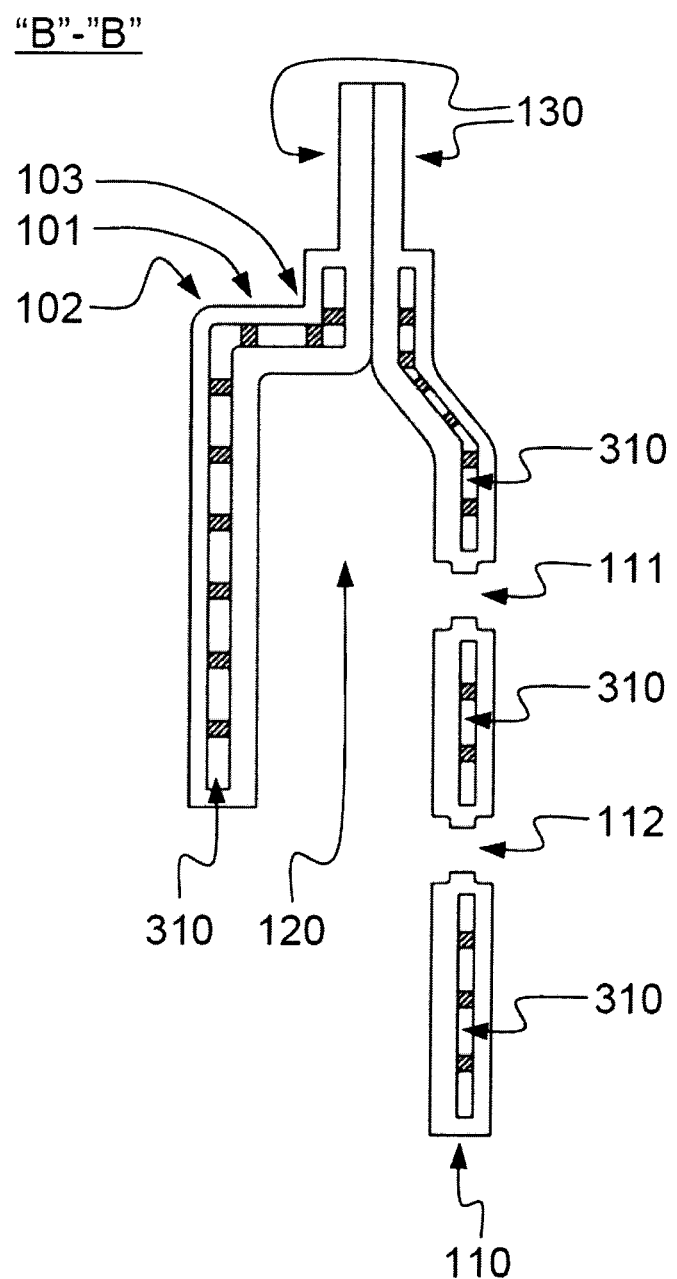

[FIG. 5]
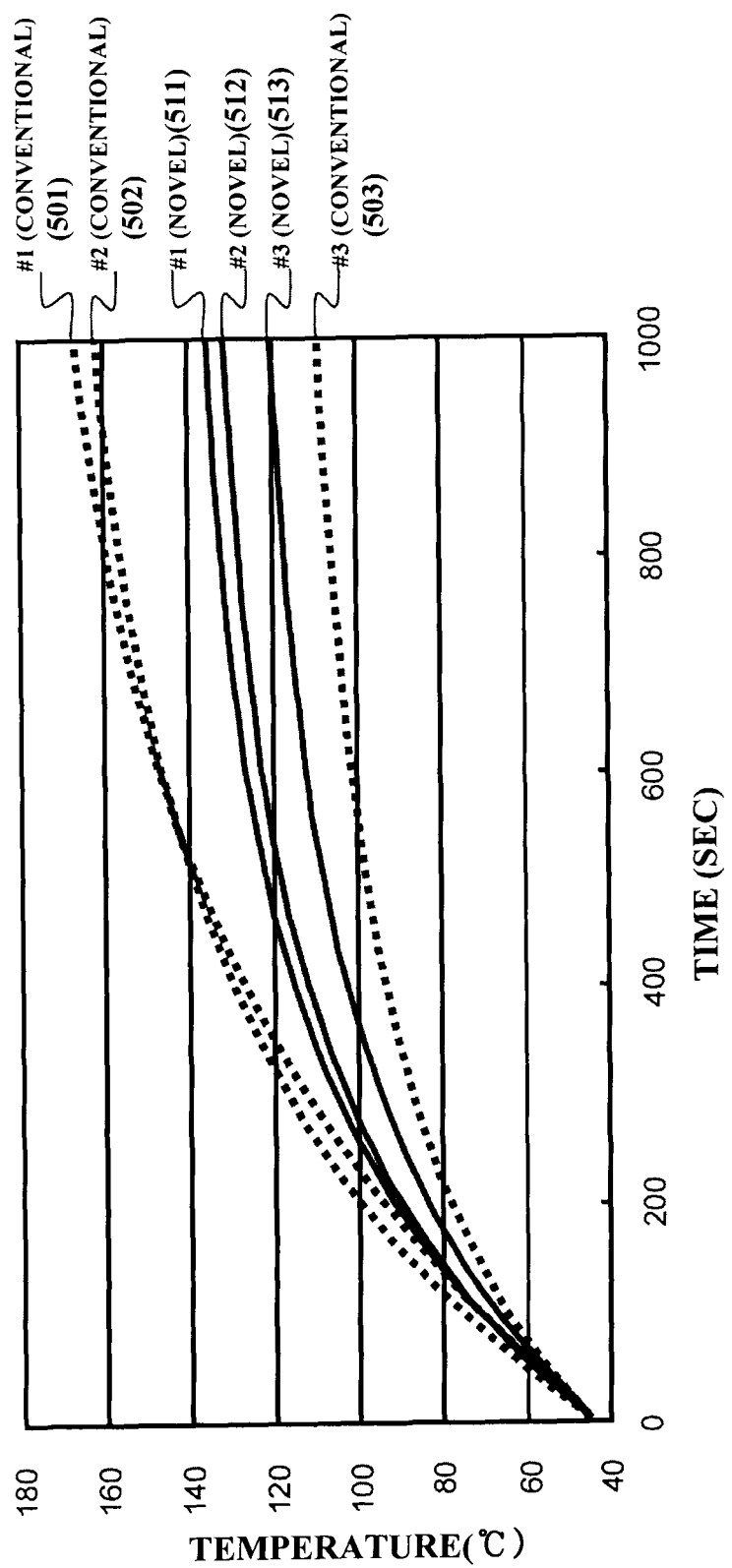

BUS BAR WITH NOVEL STRUCTURE

This application is a National Stage Application of International Application No. PCT/KR2013/000518, filed Jan. 23, 2013, and claims priority to and the benefit of Korean Patent Application No. 10-2012-0012024, filed on Feb. 6, 2012, the disclosures of which are incorporated herein by reference in their entirety.

TECHNICAL FIELD

The present invention relates to a bus bar having a novel structure, and, more particularly, to a bus bar connected or fastened to a terminal part of a battery pack and fixedly mounted to a battery pack case, the bus bar including a power input part located at one end of the bus bar such that the power input part is connected or fastened to an output terminal part of the battery pack, a power output part located at the other end of the bus bar such that the power output part is connected or fastened to an input terminal part of the battery pack, a plate-shaped main body connected between the power input part and the power output part, the plate-shaped main body including a vapor chamber, and a fastening part formed at the power input part to fix the bus bar to the battery pack case.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to each other because high power and large capacity are necessary for the middle or large-sized devices.

Generally, a plurality of unit cells is mounted in a cartridge which connects the unit cells in series or in parallel to each other, and a plurality of cartridges is electrically connected to each other, thereby manufacturing a battery module. According to circumstances, two or more battery modules may be electrically connected to each other, thereby manufacturing a middle or large-sized battery system providing higher power.

Preferably, a middle or large-sized battery module is manufactured so as to have as small a size and weight as possible. For this reason, a prismatic battery or a pouch-shaped battery, which can be stacked with high integration and has a small weight to capacity ratio, is usually used as a battery cell (unit cell) of the middle or large-sized battery module. In particular, much interest is currently focused on such a pouch-shaped battery, which uses an aluminum laminate sheet as a sheathing member, because the pouch-shaped battery is lightweight, the manufacturing cost of the pouch-shaped battery is low, and the shape of the pouch-shaped battery is easily modified.

Meanwhile, connection between electrode terminals is necessary to achieve electrical connection between batteries (including unit cells), between battery cartridges, or between battery modules and connection between an external device and the batteries, the battery cartridges, or the battery modules for power from the batteries, the battery cartridges, or the battery modules to be supplied to the external device. Also, in a case in which a signal, such as voltage, to control the operation of a battery as a power source, connection between corresponding connection members and electrode terminals is necessary.

Generally, a bus bar is used as a member for connection of the electrode terminals. The bus bar is a passage, through which current from a battery module flows. For this reason, the temperature of the bus bar is increased in proportion to the amount of current flowing in the bus bar.

Also, the bus bar includes a power input part to receive current from an output terminal of the battery module, a power output part to transmit the current to an input terminal of the battery module, and a main body connected between the power input part and the power output part.

FIG. 5 is a graph showing time based temperature change of a bus bar measured by temperature measurement devices mounted at three points of the bus bar when current is supplied to the bus bar. As shown in FIG. 2, the temperature measurement devices are mounted at positions 601, 602, and 603 of the surface of the bus bar.

Referring to FIG. 5 together with FIG. 2, #1 indicates a position 601 of a power output part, #2 indicates a position 602 of a main body, and #3 indicates a position 603 of a power input part.

Temperatures of the respective regions of the bus bar 1000 seconds after power is applied to the bus bar are as follows. As can be seen from the graph, temperature 501 of the power output part at the position 601 and temperature 502 of the main body at the position 602 are distributed in a range between 160 and 170 degrees.

On the other hand, it can be seen that temperature 503 of the power input part at the position 603 is distributed in a range between 105 and 115 degrees.

As can be seen from the above temperature distribution, the temperature 503 of the power input part at the position 603 is greatly different from the temperature 501 of the power output part at the position 601 and the temperature 502 of the main body at the position 602. As can be seen from the graph of FIG. 5, such temperature deviation of the bus bar is increased with the passage of time.

Also, in a case in which such temperature deviation of the bus bar is continued, hot spots are generated at the bus bar with the result that a battery module may be thermally damaged. Such damage may put the battery module in great danger.

In addition, the temperature deviation of the bus bar may be negatively affect electrical conductivity, which may reduce output efficiency of the battery module.

For this reason, there is a necessity for a method of removing or discharging heat generated from the bus bar, which is mounted to terminal connection regions, outside. Some conventional technologies for removing or discharging heat generated from the bus bar outside have been proposed; however, a method capable of fundamentally solving the above problems has not yet been developed.

In some conventional technologies for removing or discharging heat generated from the bus bar outside, a heat exchange member is further mounted to the bus bar, or a cooling structure to indirectly cool the bus bar is provided, in order to solve the problems associated with the bus bar as described above.

However, the structure in which the heat exchange member is further mounted to the bus bar or the cooling structure to indirectly cool the bus bar does not frequently obtain as sufficient a cooling efficiency as was expected at the time of design due to heat conduction resistance. Also, the structure in which the heat exchange member is further mounted to the bus bar requires an additional space in which the heat exchange member will be mounted, which causes the increase in total size of the battery module.

Therefore, there is a high necessity for a bus bar with high cooling efficiency wherein the overall temperature of the bus bar is uniformly maintained such that temperature deviation of the bus bar is reduced while the increase in overall size of a battery module is restrained, and hot spots are prevented from being generated at the bus bar.

DISCLOSURE

Technical Problem

Therefore, the present invention has been made to solve the above problems and other technical problems that have yet to be resolved.

It is an object of the present invention to provide a bus bar configured to have a structure in which the overall temperature of the bus bar is uniformly maintained such that temperature deviation of the bus bar is reduced and hot spots are prevented from being generated at the bus bar, thereby preventing a battery module from being damaged due to the bus bar.

It is another object of the present invention to provide a battery module wherein cooling efficiency of the battery module is maximized while the increase in overall size of the battery module is restrained.

Technical Solution

In accordance with one aspect of the present invention, the above and other objects can be accomplished by the provision of a bus bar connected or fastened to a terminal part of a battery pack and fixedly mounted to a battery pack case, the bus bar including a power input part located at one end of the bus bar such that the power input part is connected or fastened to an output terminal part of the battery pack, a power output part located at the other end of the bus bar such that the power output part is connected or fastened to an input terminal part of the battery pack, a plate-shaped main body connected between the power input part and the power output part, the plate-shaped main body including a vapor chamber, and a fastening part formed at the power input part to fix the bus bar to the battery pack case.

In a general battery module, a heat exchange member is further mounted to the bus bar, or a cooling structure to indirectly cool the bus bar is provided, in order to prevent the bus bar from being locally overheated as previously described. However, a sufficient cooling effect is not achieved.

In the bus bar according to the present invention, on the other hand, the power input part, the power output part, and the plate-shaped main body are configured to have a structure including the vapor chamber such that heat is removed from the bus bar through heat conduction based on phase change of a coolant in the vapor chamber, thereby achieving a uniform temperature of the entire bus bar and thus reducing temperature deviation and preventing hot spots from being generated at the bus bar and thus preventing the battery module from being damaged due to the bus bar.

Also, the bus bar according to the present invention is configured to have a structure which does not require an additional heat exchange member for heat dissipation of the bus bar. Consequently, it is possible to maximize cooling efficiency of the battery module while restraining the increase in overall size of the battery module.

The vapor chamber will hereinafter be described in detail.

Generally, a heat sink is used to discharge heat generated from a device or a system outside. Performance of the heat sink is determined based on heat resistance having a lower value and exhibiting higher performance. Such heat resistance includes heat dissipation resistance in transfer resistance of the heat sink between the surface of the heat sink and surroundings thereof. In order to minimize such heat dissipation resistance, the heat sink is generally made of a high conductivity material, such as copper or aluminum. However, such a solid diffusion mechanism is not generally sufficient to satisfy a higher cooling degree necessary to cool new electronic equipment. For this reason, more efficient mechanisms have been developed and evaluated. A vapor chamber is one mechanism which is often considered.

Generally, the vapor chamber includes a main body made of a heat conductive material, the main body having a micro flow channel defined therein, and a coolant circulating through the micro flow channel. While the coolant is circulated through the micro flow channel, the phase of the coolant is changed to absorb external heat or discharge heat outside.

Specifically, a heat dissipation principle of the vapor chamber is identical to a heat pipe principle in which a coolant, the phase of which has been changed into a vapor state, transfers heat to a heat pipe, and the heat is dissipated as the vapor flows. The coolant, the phase of which has been changed into the vapor state, is condensed on a cooling surface with the result that heat is transferred from an evaporation surface to the cooling surface.

The vapor chamber may be mounted in various forms. In the simplest form, the vapor chamber may be used in a flat heat spreader in which heat is dissipated from a heat source, the flat heat spreader being in contact with fins or another cooling system. In another form, the vapor chamber may be used in a heat sink. In this form, the vapor chamber may be in thermal contact with solid fins, or the vapor chamber may include fin chambers functionally connected to a base. In the latter case, the solid fins may be in contact with the fin chambers to maximize a convection surface. In another embodiment, the vapor chamber may be mounted on a printed circuit board, particularly a daughter board, in a vaporclip form. Also, the vapor chamber may be mounted in a vaporcase form, in which electronic devices are functionally arranged. In addition, the vapor chamber may be mounted in the form of a cabinet in which vaporcases are functionally arranged.

The coolant may be air, water, or a refrigerant. For liquid cooling, a heat exchanger having the vapor chamber may be configured to have an open shell type structure, a serial flow type structure, a parallel flow type structure, or a combination thereof.

In a further embodiment, the vapor chamber may be made of metal, plastic, and/or composite materials. The surface of the vapor chamber may functionally contact various materials, such as plastic, metal coating, a graphite layer, diamond, carbon nanotubes, and/or a highly conductive material well known in the art to which the present invention pertains.

In the present invention, the power input part may include a terminal connection member and may be fastened to the terminal connection member by rolling.

Such a fastening method does not require additional connection members for fastening. Since an additional space necessary to mount the connection members and an additional process of mounting the connection members are not necessary, it is possible to efficiently assemble a compact battery module.

In a preferred example, the power input part may be bent toward the terminal connection member in a ']' or '⌊' shape, and the terminal connection member may include one or more fastening holes, by which the terminal connection member is fastened to the battery pack case or an external member by coupling.

Specifically, the fastening part formed at the power input part may be achieved through the coupling between the power input part and a terminal connection member and may be formed in a bracket shape, when viewed in a lateral direction, such that the fastening part is fastened to the battery pack case or an external member by coupling.

Meanwhile, the power output part may be bent toward the input terminal part of the battery pack in a ']' or '⌊' shape.

In a preferred example, opposite ends of the plate-shaped main body may be continuously connected with the power input part and the power output part.

According to circumstances, the plate-shaped main body may include one or more steps, by which the plate-shaped main body is fastened to the battery pack case or an external member by coupling. Correspondingly, a groove corresponding to the step may be formed at the battery pack case or the external member.

Such a method of fastening the step to the groove corresponding thereto does not require additional connection members for fastening, and therefore, it is also possible to efficiently assemble a compact battery module.

In a preferred example, the vapor chamber may include an upper plate and a lower plate, which are made of a heat conductive material, and support members and mesh structures may be disposed in the vapor chamber. In this case, the material for the upper plate and the lower plate is not particularly restricted so long as the upper plate and the lower plate are made of a material exhibiting high electrical conductivity, by which electrical connection between terminals of the battery pack is achieved, and high heat conductivity, by which heat generated as current flows in the bus bar is transferred to the outside. Preferably, the upper plate and the lower plate are made of copper.

Micro flow channels, along which a coolant flows, may be disposed between the upper plate and the lower plate, and the micro flow channels may be defined by support members.

The micro flow channels may be easily modified based on the shape of a cooling system. Also, the micro flow channels may be formed of a wide variety of materials. In addition to application to the bus bar according to the present invention, the micro flow channels may be variously and easily applied to a region at which a compact heat exchange system is necessary.

The coolant is not particularly restricted so long as the coolant is circulated in the vapor chamber to absorb external heat or discharge heat outside through phase change. Preferably, the coolant is water.

Specifically, the phase change may be evaporation or liquefaction. The phase change induces circulation of the coolant in the micro flow channels. For this reason, the phase change may be referred to as capillary force.

Also, the vapor chamber may be a heat exchange system in which the coolant is automatically circulated by capillary force. Basically, the phase of the coolant may be changed in order of evaporation (vaporization)—vapor movement—liquefaction (condensation)—return.

In the evaporation process, heat is conducted from a heat source via a solid surface, the heat is absorbed by liquid films, which are thinly formed, as evaporation latent heat, and, when the phase of a coolant is changed from a liquid phase to a gaseous phase, the phase changed coolant is distributed in a condenser, which has a large area, through a gas flow channel without heat loss as the result of the increase in pressure in the upper end of an evaporator In the condensing process, on the other hand, the vapor introduced from the gas flow channel is condensed into a liquid by a cooled wall, heat of condensation is conducted via the solid wall and is then is discharged outside. At this time, the condensed liquid may return to the evaporator through the micro flow channels by capillary force.

In accordance with other aspects of the present invention, there are provided a battery pack including one or more bus bars mounted to a pack case and a device including a battery pack as a power source. The device may be an electric vehicle, a hybrid electric vehicle, a plug-in hybrid electric vehicle, or a power storage device; however, the device is not limited thereto.

The structure of the device and a manufacturing method of the device are well known in the art to which the present invention pertains, and therefore, a detailed description thereof will be omitted.

Effects of the Invention

As is apparent from the above description, the bus bar according to the present invention is configured such that the vapor chamber structure is applied to the power input part, the power output part, and the plate-shaped main body of the bus bar, thereby uniformly maintaining the overall temperature of the bus bar to reduce temperature deviation of the bus bar while minimizing the increase in overall size of the battery module and effectively discharging heat generated from the bus bar outside.

DESCRIPTION OF DRAWINGS

The above and other objects, features and other advantages of the present invention will be more clearly understood from the following detailed description taken in conjunction with the accompanying drawings, in which:

FIG. 1 is a perspective view showing a bus bar according to the present invention;

FIG. 2 is a side view of the bus bar according to the present invention;

FIG. 3 is a sectional view taken along line "A"-"A" of FIG. 2;

FIG. 4 is a sectional view taken along line "B"-"B" of FIG. 2; and

FIG. 5 is a graph showing time based local temperature change of the bus bar according to the present invention and a conventional bus bar.

DETAILED DESCRIPTION OF THE INVENTION

Now, a preferred embodiment of the present invention will be described in detail with reference to the accompanying drawings. It should be noted, however, that the scope of the present invention is not limited by the illustrated embodiment.

FIG. 1 is a perspective view showing a bus bar according to the present invention.

Referring to FIG. 1, a bus bar 400 according to the present invention includes a power input part 100, a power output part 200, a plate-shaped main body 300, and a fastening part 120.

Also, the bus bar 400 further includes a terminal connection member 110 and a step 320.

The power input part 100 is bent (see reference numeral 101) toward the terminal connection member 110 and is fastened (see reference numeral 130) to the terminal connection member 110 by rolling.

Such a fastening method does not require additional connection members for fastening. Since an additional space necessary to mount the connection members and an additional process of mounting the connection members are not necessary, it is possible to efficiently assemble a compact battery module.

Also, the terminal connection member 110 includes two fastening holes 111 and 112, by which the terminal connection member 110 is fastened to a battery pack case (not shown) or an external member (not shown) by coupling.

Meanwhile, the power output part 200 is bent (see reference numeral 201) toward an input terminal part (not shown) of a battery pack (not shown).

FIG. 2 is a side view showing a bus bar according to an embodiment of the present invention, and FIGS. 3 and 4 are sectional views of FIG. 2.

Referring to these drawings together with FIG. 1, the plate-shaped main body 300 is configured to have a structure in which opposite ends of the plate-shaped main body 300 are continuously connected with the power input part 100 and the power output part 200.

Also, the plate-shaped main body 300 includes a step 320, by which the plate-shaped main body 300 is fastened to the battery pack case (not shown) or the external member (not shown) by coupling.

Correspondingly, a groove (not shown) corresponding to the step 320 is formed at the battery pack case (not shown) or the external member (not shown). Such a method of fastening the step 320 to the groove corresponding thereto does not require additional connection members for fastening, and therefore, it is also possible to efficiently assemble a compact battery module.

Meanwhile, the construction of the power input part 100 is achieved through the coupling between the power input part 100 and the terminal connection member 110. When viewed in the lateral direction, the power input part 100 is formed in a bracket shape such that the power input part 100 is fastened to the battery pack case (not shown) or the external member (not shown) by coupling.

Referring to a sectional view taken along line "A"-"A" and a sectional view taken along line "B"-"B", the bus bar 400 according to the present invention includes the power input part 100, the plate-shaped main body 300, and the power output part 200, each of which is configured to have a structure including a vapor chamber 310.

Specifically, the vapor chamber 310 includes an upper plate 311 and a lower plate 312, both of which are made of copper. A thickness H' of the upper plate 311 is less than a thickness H of the lower plate 312.

Also, support members 313 and mesh structures 314 are disposed in the vapor chamber 310, and micro flow channels 315, along which a coolant flows, are disposed between the upper plate 311 and the lower plate 312.

The vapor chamber 310 including the micro flow channels 315 defined therein may be easily modified based on the shape of a cooling system. As shown in FIG. 4, the vapor chamber 310 is also applied to the power input part 100 fastened by rolling (see reference numeral 130) and including the two fastening holes 111 and 112.

In the bus bar 400 according to the present invention, therefore, the vapor chamber 319 structure is applied to the power input part 100, the plate-shaped main body 300, and the power output part 200, thereby achieving high heat conductivity based on flow of the coolant 316 in the vapor chamber 310.

Specifically, the coolant 316 flowing in the vapor chamber 310 may be water, and the vapor chamber 310 may be a heat exchange system in which the coolant is automatically circulated in the vapor chamber 310 by capillary force naturally generated when the phase of the coolant is changed in the micro flow channels 315. Basically, the phase of the coolant is changed in order of evaporation (vaporization)—vapor movement—liquefaction (condensation)—return.

External heat transferred to the lower plate 312, which is thicker than the upper plate 311, is absorbed by coolant liquid films 316 thinly formed in the respective micro flow channels 315. The coolant liquid films 316 change the coolant from a liquid phase to a gaseous phase using the absorbed heat. The phase changed coolant increases pressure in some of the micro flow channels 315. As a result, the phase changed coolant flows to the other micro flow channels 315 having relatively low pressure. During flow, the phase changed coolant is condensed into a liquid phase by the inner walls of the upper plate 311, the temperature of which is lower than that of the lower plate 312. At this time, heat of condensation is discharged outside via the upper plate 311. The condensed coolant returns to the original place through the micro flow channels 315 by capillary force.

FIG. 5 is a graph showing time based local temperature change of the bus bar according to the present invention and a conventional bus bar.

Referring to FIG. 5 together with FIG. 2, #1, #2, and #3 indicate positions 601, 602, and 603 of temperature measurement devices located on the surface of the bus bar 400. Specifically, #1 indicates a position 601 of the bus bar 400 at the power output part 200 side, #2 indicates a position 602 of the middle portion of the plate-shaped main body 30, and #3 indicates a position 603 of the bus bar 400 at the power input part 100 side.

Also, the graph of FIG. 5 shows time (X axis) based temperature (Y axis) change of the conventional bus bar (not shown) at regions 501, 502, and 503 and the bus bar 400 according to the present invention at regions 511, 512, and 513 while current is supplied to the bus bar 400.

As can be seen from the graph, the conventional bus bar (not shown) has a temperature deviation of 50 to 60 degrees after the lapse of 1000 seconds, and hot spots are generated at positions #1 and #2. On the other hand, the bus bar 400 according to the present invention has a temperature deviation of 10 to 15 degrees, and the overall temperature of the bus bar 400 is uniform.

This is because the conventional bus bar made of copper has a heat transfer coefficient of about 400 W/mK, whereas the bus bar 400 according to the present invention has a heat transfer coefficient of about 5,000 W/mK.

In the bus bar 400 according to the present invention, therefore, the vapor chamber 319 structure is applied to the power input part 100, the plate-shaped main body 300, and the power output part 200, thereby achieving overall uniform temperature of the bus bar 400 and thus reducing temperature deviation and effectively discharging heat generated from the bus bar 400 outside.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

The invention claimed is:

1. A bus bar connected or fastened to a terminal part of a battery pack and fixedly mounted to a battery pack case, the bus bar comprising:
   a power input part located at one end of the bus bar such that the power input part is connected or fastened to an output terminal part of the battery pack;
   a power output part located at the other end of the bus bar such that the power output part is connected or fastened to an input terminal part of the battery pack;
   a plate-shaped main body connected between the power input part and the power output part, wherein the plate-shaped main body has a structure including a vapor chamber for receiving a coolant defined by an upper plate and a lower plate, which are made of a heat conductive material, and support members and mesh structures are disposed in the vapor chamber and disposed between the upper plate and lower plate; and
   a fastening part formed at the power input part to fix the bus bar to the battery pack case,
   wherein the coolant is circulated within the vapor chamber to absorb external heat or discharge heat outside through phase change, and
   wherein a thickness of the upper plate is less than a thickness of the lower plate.

2. The bus bar according to claim 1, wherein the power input part comprises a terminal connection member and is fastened to the terminal connection member by rolling.

3. The bus bar according to claim 2, wherein the power input part is bent toward the terminal connection member in a ']' or '[' shape.

4. The bus bar according to claim 2, wherein the terminal connection member comprises one or more fastening holes, by which the terminal connection member is fastened to the battery pack case or an external member by coupling.

5. The bus bar according to claim 1, wherein the power output part is bent toward the input terminal part of the battery pack in a ']' or '[' shape.

6. The bus bar according to claim 1, wherein opposite ends of the plate-shaped main body are continuously connected with the power input part and the power output part.

7. The bus bar according to claim 1, wherein the plate-shaped main body comprises one or more steps, by which the plate-shaped main body is fastened to the battery pack case or an external member by coupling.

8. The bus bar according to claim 1, wherein the upper plate and the lower plate are made of copper.

9. The bus bar according to claim 1, wherein micro flow channels, along which a coolant flows, are disposed between the upper plate and the lower plate, the micro flow channels being defined by support members.

10. The bus bar according to claim 9, wherein the coolant is water.

11. The bus bar according to claim 1, wherein the phase change is evaporation or liquefaction.

12. The bus bar according to claim 1, wherein the fastening part formed at the power input part is achieved through the coupling between the power input part and a terminal connection member and is formed in a bracket shape, when viewed in a lateral direction, such that the fastening part is fastened to the battery pack case or an external member by coupling.

13. A battery pack comprising a bus bar according to claim 1.

14. A device comprising a battery pack according to claim 13.

15. The device according to claim 14, wherein the device is an electric vehicle, a hybrid electric vehicle, a plug-in hybrid electric vehicle, or a power storage device.

* * * * *